United States Patent [19]

Hazel

[11] 4,233,077
[45] Nov. 11, 1980

[54] PREPARING EXTRUDABLE REFRACTORY HARD METAL-WAX BLENDS

[75] Inventor: John G. Hazel, Barberton, Ohio

[73] Assignee: PPG Industries, Inc., Pittsburgh, Pa.

[21] Appl. No.: 792,422

[22] Filed: Apr. 29, 1977

[51] Int. Cl.² ............................ C04B 35/64; C08J 3/20
[52] U.S. Cl. ............................................ 106/43; 264/63; 106/44; 260/42.54
[58] Field of Search ................. 106/44, 43, 73.3, 73.4, 106/73.2, 38.25, 272; 423/297, 440, 409, 411, 412, 251, 252, 256, 254, 345, 439; 264/63; 260/42.54

[56] References Cited

U.S. PATENT DOCUMENTS

| | | | |
|---|---|---|---|
| 1,977,698 | 10/1934 | Scott | 106/73.4 |
| 2,363,575 | 11/1944 | De Lamatter et al. | 106/43 |
| 2,593,507 | 4/1952 | Wainer | 106/44 X |
| 2,593,507 | 4/1952 | Wainer | 264/63 |
| 3,137,742 | 6/1964 | Sowden | 106/73.2 |
| 3,234,308 | 2/1966 | Herrmann | 264/63 |
| 3,422,173 | 1/1969 | Bergstrom et al. | 264/59 |
| 3,540,894 | 11/1970 | McIntosh | 106/73.4 |
| 3,740,243 | 6/1973 | Kappes et al. | 106/73.4 |
| 3,765,300 | 10/1973 | Taylor et al. | 106/44 |
| 3,859,399 | 1/1975 | Bailey et al. | 106/44 |
| 3,926,857 | 12/1975 | Matkin et al. | 106/44 |
| 4,108,670 | 8/1978 | Steiger et al. | 106/40 R |
| 4,123,286 | 10/1978 | Coppola | 106/44 |

*Primary Examiner*—O. R. Vertiz
*Assistant Examiner*—Mark Bell
*Attorney, Agent, or Firm*—Irwin M. Stein

[57] ABSTRACT

Extrudable and injection-moldable blends of submicron refractory hard metal powders, i.e., carbides, borides, and nitrides of Groups III–V metals, with solid plasticizers, e.g., paraffin waxes or synthetic resins, are prepared by wetting the refractory powder with a solvent for the plasticizer, blending solvent-wetted powder with plasticizer at temperatures at which the resulting mixture is liquid, removing solvent from the mixture while blending is continued, and cooling the solvent-depleted mixture.

12 Claims, No Drawings

PREPARING EXTRUDABLE REFRACTORY HARD METAL-WAX BLENDS

BACKGROUND OF THE INVENTION

This invention relates to the preparation of extrudable and injection moldable compositions comprising submicron refractory hard metal powders such as silicon carbide and titanium diboride powders, and hydrocarbon plasticizers such as paraffin waxes and synthetic resins.

Techniques for forming refractory powders into shapes for sintering include the extrusion or injection molding of a blend of the refractory powder with a plasticizer which enables the blend to flow under heat and pressure. The quality of an article made by extrusion or injection molding depends in significant part upon the uniformity of the powder-plasticizer blend. Submicron powders, i.e., powders having particles predominantly under one micron in size, have a tendency to agglomerate. Consequently, they tend to resist dispersion in plasticizers such as molten wax. When such powders are added in a dry state to molten plasticizer, extended mixing periods may be required to work the powder uniformly into the plasticizer. However, even with extended mixing, uniform blending of the powder and the plasticizer may not be achieved.

U.S. Pat. No. 3,234,308 describes the blending of comminuted ceramic with organic binder (a) cold, in a ball mill, and (b) in a heated muller, the ceramic being added to melted organic binder and the resulting mixture being cooled. U.S. Pat. No. 3,422,173 describes preparing a blend of ferrite and a wax binder on a two-roll rubber mill. U.S. Pat. No. 2,593,507 describes mixing refractory powder and organic binder above the melting point of the binder in a heated mixer and also describes dissolving the organic binder in solvent, adding the refractory powder and mixing, and then heating to eliminate the solvent.

DESCRIPTION OF THE INVENTION

It has now been found that submicron refractory hard metal powders may be blended easily with plasticizer to form an extrudable composition in which the powder is well dispersed and free of large agglomerates. In accordance with this invention, the refractory powder is wetted with a solvent for the plasticizer and then blended with the plasticizer at temperatures at which the resulting mixture is a liquid slurry. While blending is continued, solvent is removed, and the solvent-depleted mixture is then cooled.

In a preferred embodiment of this invention, the powder is slurried in solvent, any agglomerates present being broken up or removed, and the agglomerate-free slurry is blended with molten plasticizer.

Powders useful in the practice of this invention are submicron borides, carbides, and nitrides of the metals of Groups III, IV, and V of the Periodic Table of the Elements, such as the table shown inside the back cover of Handbook of Chemistry and Physics, 45th Ed. (Cleveland: The Chemical Rubber Co., 1964). Such borides, carbides, and nitrides and methods of making them are disclosed in U.S Pat. No. 3,979,500 and German Offenlegungsschrift No. 25 23 423, published Aug. 5, 1976, which corresponds to U.S. Pat. application of Roger A. Steiger, Ser. No. 546, 835, filed Feb. 3, 1975, and U.S. Pat. application of Howard H. Hoekje, Ser. No. 546,838, filed Feb. 3, 1975, now abandoned.

The entire disclosures of U.S. Pat. No. 3,979,500 and Offenlegungsschrift No. 25 23 423 are incorporated herein by reference.

Among the borides disclosed are the titanium borides (TiB, $TiB_2$), the silicon borides ($SiB_3$, $SiB_6$), the zirconium borides ($ZrB_2$, $ZrB_{12}$), hafnium boride, the vanadium borides (VB, $VB_2$), the niobium borides (NbB, $NbB_2$), the tantalum borides (TaB, $TaB_2$), the chromium borides (CrB, $CrB_2$), the molybdenum borides ($Mo_2B$, MoB) (alpha and beta) ($MoB_2$, and $Mo_2B_5$), tungsten boride, thorium boride, and uranium boride.

Among the carbides disclosed are titanium carbide, zirconium carbide, hafnium carbide, vanadium carbide, niobium carbide, the tantalum carbides ($Ta_2C$, TaC), silicon carbide (alpha and beta), boron carbide ($B_4C$), chromium carbide, molybdenum carbide, the tungsten carbides ($W_2C$, WC), the thorium carbides (ThC, $ThC_2$), and the uranium carbides (UC, $U_2C_3$, and $UC_2$).

Among the nitrides disclosed are titanium nitride, silicon nitride, zirconium nitride, hafnium nitride, vanadium nitrides (VN, $V_3N$), niobium nitride, tantalum nitride, boron nitride, the chromium nitrides ($Cr_2N$, CrN), molybdenum nitride, tungsten nitride (beta, gamma, and alpha), the molybdenum nitrides ($Mo_2N$, MoN), thorium nitride, the uranium nitrides ($U_2N_3$, $UN_2$), neptunium nitride, and plutonium nitride.

Briefly, such submicron powders are prepared by vapor phase reaction of the corresponding metal halide, e.g., titanium halide, and a vaporous source of carbon, boron, or nitrogen respectively in a reactor. The reactants are introduced into an arc-heated stream of diluent gas, such as hydrogen, flowing into the reactor and are reacted therein. The products so produced are powdery, with individual particles typically submicron in size, ranging from about 0.01 to about 1.0 micron.

Plasticizers herein contemplated for use in the practice of this invention are organic compounds that are solid at room temperature and are viscous liquids above their melting point. At extrusion temperatures and pressures, they become plastic and enable the powder compositions containing them to flow through the extruder. They melt above about 35° C., typically between about 40° and 100° C. Such organic plasticizers include waxes such as amorphous and microcrystalline paraffin waxes, synthetic resins such as polybutene, polystyrene, polyacrylate, polymethacrylate, polyethylene, polypropylene, polyethylene oxide, polyvinyl butyl ether, and halogenated derivatives thereof, including chlorinated and fluorinated polyethylene, chlorinated biphenyls, naphthalene, camphor, and p-dichlorobenzene. Hydrocarbon waxes and resins, i.e., those made up only of carbon and hydrogen, are preferred because some refractory powders, notably titanium diboride, are sensitive to contamination by oxygen, sulfur, and other substances. The plasticizer used with a particular refractory powder is one which does not react unfavorably with the powder under the conditions of blending, extruding, and sintering employed.

Because the function of plasticizers in extrudable refractory powder compositions is primarily physical rather than chemical, equivalents to the waxes and synthetic resins mentioned can easily be selected by one skilled in the extrusion of such compositions. Thus, although hydrocarbon waxes and resins are preferred for use with contaminant-sensitive powders such as titanium diboride powders, plasticizers containing other substances, such as oxygen or nitrogen, may be used in blends with less sensitive powders such as silicon carbide powders.

In the practice of this invention, the known powders and plasticizers described above are blended in a novel way to provide extrudable blends of uniform composition. The selected refractory powder is first wetted with an organic solvent that enables the powder to be easily mixed with the plasticizer to form a uniform mixture of powder, plasticizer, and solvent.

Useful solvents are those which are chemically inert to the refractory powder, which are miscible with the plasticizer in the proportions and at the mixing temperatures employed, and which are volatile enough to be removed by heating of the mixture under vacuum at temperatures which do not entail undesirable decomposition or vaporization of the plasticizer. Ordinarily, the solvent will be a liquid in which the plasticizer is soluble to some extent at room temperature. Such solvents include hydrocarbons such as pentane, hexane, heptane, gasoline, kerosine, benzene, toluene, and xylene; halogenated hydrocarbons such as methylene chloride, carbon tetrachloride, methyl chloroform, perchloroethylene, trichloroethylene, and chlorobenzene; oxygen containing solvents such as dioxane, dioxolane, acetone, methyl ethyl ketone, and tetrahydrofuran. The hydrocarbon solvents are preferred for use with the preferred hydrocarbon plasticizers.

Sufficient solvent is used to wet the refractory powder to facilitate the mixing thereof with the plasticizer. The exact proportion of solvent to powder can vary widely. The minimum proportion depends upon the surface area of the powder. There is no maximum proportion, but it is usually not necessary to use more solvent than is required to form a pourable slurry with the powder. The minimum amount of solvent to use with a particular powder may be determined by observing how the solvent-containing powder blends into molten plasticizer and adding solvent to the powder until it blends in quickly without a tendency to float or agglomerate. It is preferable to use enough solvent to form a pourable slurry with the powder. Larger agglomerates may then be broken down by high shear stirring before it is mixed with the plasticizer of the slurry.

If desired, the powder can be screened to remove agglomerates before it is wetted. A dilute slurry can be screened and allowed to settle, the supernatant solvent being decanted before the slurry is mixed with the plasticizer.

The solvent-wetted powder is then blended with the plasticizer at temperatures such that plasticizer and solvent form a liquid mixture having the solid powder suspended or slurried therein. Usually, the temperature is above the melting point of the plasticizer, but if a substantial proportion of solvent is used, the action of the solvent on the plasticizer may render the mixture liquid even at temperatures below the melting point of the plasticizer. Blending proceeds quickly; periods of mixing of from 1 minute to 1 hour or more may be used, depending upon the size of the batch.

The usual proportions of plasticizer to refractory powder may be used in the practice of this invention. Typically, the plasticizer is used in amounts between about 10 and 50 percent by weight of refractory powder, exclusive of solvent. Preferred proportions vary widely because the densities of refractory powders and the characteristics of plasticizers and extruders do, also. One skilled in the extrusion of plasticized refractory powders is competent to select useful proportions. Blends containing much less than 10 percent plasticizer by weight of refractory powder, for example, from about 0.5 to 5 weight percent, are usually pressed in molds and are not included within the term "extrudable refractory powder composition" as it is used herein in the specification and the claims.

In a preferred embodiment of this invention, the plasticizer, e.g., paraffin, is melted in a heated mixer, the mixer is started, and a slurry of refractory powder and solvent for the plasticizer is added to the molten plasticizer.

After the wetted powder has been added, heating and mixing are continued to remove solvent. A vacuum may be applied to speed the removal of solvent. Preferably, substantially all of the solvent is removed. If a substantial amount of solvent remains in the powder-plasticizer composition, extruded articles will have to be heated at moderate temperatures for long periods to drive out the solvent before they can be sintered. Otherwise, unacceptable porosity may result from sudden vaporization of the solvent. However, some solvent may be left in the composition so long as the composition is solid at room temperature so that it can be granulated for feeding to an extruder.

Then, in accordance with the usual practice in the industry, the extruded article is pre-sintered by heating at 100° to 400° C. for about 0.5 to 3.0 hours in order to drive off the plasticizer, and is then sintered at temperatures useful for the particular refractory employed.

The following example illustrates how the present invention may be practiced.

EXAMPLE

Submicron silicon carbide powder having surface area of 6.3 square meters per gram (nitrogen adsorption method of Brunauer, Emmett, and Teller, *Journal of American Chemical Society*, 60, page 309 (1938)) and a content of 0.18 weight percent boron as densifying aid was blended with paraffin wax having a melting point of 120° F. using hexane as solvent.

In each of two beakers, 1362 grams of silicon carbide powder was mixed with 1800-2000 cubic centimeters of hexane for about 15 minutes using a 2 inch diameter high shear blade, resulting in almost creamy slurries. The slurries were not screened, a step that would remove small agglomerates that survived the high shear mixing. All of the silicon carbide-hexane slurry was added over a period of 20 to 25 minutes to 703 grams of molten paraffin heated to 149°-158° F. in an Abbe double sigma blade mixer. Upon addition of the last of the slurry, the blend appeared quite uniform. A vacuum equivalent to a pressure of 26-27 inches of water was applied and heating and mixing were continued for five hours to remove solvent. Then the blend was allowed to cool for 30-45 minutes with mixing and was then removed from the mixer.

A portion of the blend was extruded to form rods of 5 millimeters in diameter. Segments of rod were dewaxed under vacuum by heating from 20° C. up to 260° C. over a six hour period and were then sintered for one hour at 2100° C. Four sintered segments had densities of 94.4, 94.4, 94.5, and 94.8 percent of the theoretical density of silicon carbide, 3.22 grams per cubic centimeter. Upon fracturing the segments, flaws in the form of colored inclusions were noted, but it is believed that screening of diluted powder-solvent slurry through a 325 mesh sieve would eliminate them.

By following the procedure described in this example using other refractory powders or mixtures thereof, other plasticizers, and suitable solvents, a wide variety of extrudable compositions can be prepared.

Although this invention has been described in terms of particular details and embodiments, these particulars are not intended to limit the invention, the scope of which is defined by the following claims.

I claim:

1. A method of preparing an extrudable refractory powder composition which comprises:
    (a) mixing submicron refractory powder selected from the group consisting of borides, carbides, and nitrides of metals of Groups III, IV, and V of the Periodic Table of the Elements with organic solvent that is chemically inert to the refractory powder and liquid at room temperature to form an agglomerate-free slurry of submicron refractory powder and organic solvent,
    (b) mixing said slurry with between about 10 and 50 percent by weight of solvent-free powder of organic plasticizer at temperatures above the melting point of said organic plasticizer to obtain a liquid slurry, said plasticizer being solid at room temperature and a viscous liquid above 35° C., said solvent being miscible with said plasticizer at the mixing temperatures and in the proportions used,
    (c) heating said slurry to remove substantially all of said solvent while avoiding vaporization of said plasticizer, and
    (d) cooling solvent-depleted slurry to form a solid, agglomerate-free extrudable refractory powder composition in which the refractory powder is well dispersed.

2. The method of claim 1, wherein solvent-wetted powder is added with mixing to molten plasticizer.

3. The method of claim 1, wherein solvent is removed under a vacuum.

4. The method of claim 1, wherein the organic plasticizer is a paraffin wax.

5. The method of claim 1, wherein the organic plasticizer is a synthetic resin.

6. The method of claim 1, wherein the solvent is a normally liquid hydrocarbon in which the plasticizer is soluble.

7. The method of claim 1, wherein a pourable slurry of the refractory powder and the solvent is added with mixing to the molten plasticizer.

8. The method of claim 1, wherein the refractory powder is submicron silicon carbide, the plasticizer is amorphous paraffin, and the solvent is hexane.

9. The method of claim 6 wherein the plasticizer is a hydrocarbon wax.

10. The method of claim 9 wherein the hydrocarbon wax is amorphous or microcrystalline paraffin wax.

11. The method of claim 10 wherein the refractory powder is titanium diboride.

12. The method of claim 10 wherein the refractory powder is titanium carbide, silicon carbide, tungsten carbide, zirconium carbide, boron carbide or tantalum carbide.

* * * * *